United States Patent
Gavard-Lonchay et al.

(10) Patent No.: US 11,472,946 B2
(45) Date of Patent: Oct. 18, 2022

(54) HIGH STIFFNESS RUBBER COMPOSITION

(71) Applicant: COMPAGNIE GENERALE DES ETABLISSEMENTS MICHELIN, Clermont-Ferrand (FR)

(72) Inventors: Odile Gavard-Lonchay, Clermont-Ferrand (FR); Anne-Lise Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 783 days.

(21) Appl. No.: 16/319,066

(22) PCT Filed: Jul. 20, 2017

(86) PCT No.: PCT/FR2017/051990
§ 371 (c)(1),
(2) Date: Jan. 18, 2019

(87) PCT Pub. No.: WO2018/015675
PCT Pub. Date: Jan. 25, 2018

(65) Prior Publication Data
US 2021/0347966 A1    Nov. 11, 2021

(30) Foreign Application Priority Data

Jul. 21, 2016   (FR) ...................... 1656967

(51) Int. Cl.
*C08L 7/00* (2006.01)
*B60C 1/00* (2006.01)
*C08J 3/24* (2006.01)

(52) U.S. Cl.
CPC .............. *C08L 7/00* (2013.01); *B60C 1/0041* (2013.01); *C08J 3/247* (2013.01); *C08J 2307/00* (2013.01); *C08L 2312/00* (2013.01)

(58) Field of Classification Search
CPC .................................... C08L 7/00; B60C 1/00
USPC ....................................................... 524/511
See application file for complete search history.

(56) References Cited

U.S. PATENT DOCUMENTS

| | | | |
|---|---|---|---|
| 2,776,948 A | 1/1957 | Snyder | |
| 2,804,445 A | 8/1957 | Snyder | |
| 4,511,697 A | 4/1985 | Sohnemann | |
| 5,039,777 A | 8/1991 | Yotsumoto et al. | |
| 7,066,228 B2 | 6/2006 | Grimberg et al. | |
| 7,199,175 B2 | 4/2007 | Vasseur | |
| 7,250,463 B2 | 7/2007 | Durel et al. | |
| 7,405,010 B2 | 7/2008 | Grimberg et al. | |
| 7,820,771 B2 | 10/2010 | Lapra et al. | |
| 7,900,667 B2 | 3/2011 | Vasseur | |
| 9,481,783 B2 | 11/2016 | Isobe et al. | |
| 9,840,644 B2 | 12/2017 | Doisneau et al. | |
| 9,938,434 B2 | 4/2018 | Doisneau | |
| 10,005,929 B2 | 6/2018 | Doisneau et al. | |
| 10,040,976 B2 | 8/2018 | Doisneau et al. | |
| 10,047,255 B2 | 8/2018 | Doisneau | |
| 2003/0221760 A1 | 12/2003 | Grimberg et al. | |
| 2005/0004297 A1 | 1/2005 | Durel et al. | |
| 2006/0147731 A1 | 7/2006 | Grimberg et al. | |
| 2007/0112120 A1 | 5/2007 | Vasseur | |
| 2009/0270558 A1 | 10/2009 | Gandon-pain et al. | |
| 2014/0235124 A1 | 8/2014 | Doisneau et al. | |
| 2014/0235125 A1 | 8/2014 | Doisneau et al. | |
| 2014/0308864 A1 | 10/2014 | Doisneau et al. | |
| 2014/0336331 A1 | 11/2014 | Matsuo et al. | |
| 2015/0175781 A1 | 6/2015 | Isobe et al. | |
| 2016/0251550 A1 | 9/2016 | Michoud et al. | |
| 2017/0165942 A1 | 6/2017 | Michoud et al. | |
| 2017/0166010 A1 | 6/2017 | Michoud et al. | |

(Continued)

FOREIGN PATENT DOCUMENTS

| | | |
|---|---|---|
| CN | 104428358 A | 3/2015 |
| CN | 109071743 A | 12/2018 |
| JP | 46-29008 | 8/1971 |
| JP | 2004-505147 A | 2/2004 |
| WO | 97/36724 A2 | 10/1997 |
| WO | 99/16600 A1 | 4/1999 |

(Continued)

OTHER PUBLICATIONS

C. Muller, et al., "Building Blocks from Sugars. Part 23. Hydrophilic 3-Pyridinols from Fructose and Isomaltulose", Tetrahedron, 54, pp. 10703-10712 (1998).
International Search Report dated Oct. 18, 2017, in corresponding PCT/FR2017/051990 (5 pages).
Co-pending U.S. Appl. No. 16/319,189.

*Primary Examiner* — Deve V Hall
(74) *Attorney, Agent, or Firm* — Venable LLP

(57) ABSTRACT

The rubber composition comprises at least one resin based: (A1) on at least one aromatic compound comprising at least one aromatic ring bearing at least two functional groups, one of these functional groups being a hydroxymethyl functional group and the other being an aldehyde functional group or a hydroxymethyl functional group; and (A2) on at least one phenolic compound chosen from (A21) at least one aromatic polyphenol comprising at least one aromatic ring bearing at least two hydroxyl functional groups in the meta position with respect to one another, the two positions ortho to at least one of the hydroxyl functional groups being unsubstituted; and/or (A22) at least one aromatic monophenol comprising at least one six-membered aromatic ring bearing a single hydroxyl functional group, the two positions ortho to the hydroxyl functional group being unsubstituted or at least one position ortho to and the position para to the hydroxyl functional group being unsubstituted; and their mixtures.

20 Claims, 2 Drawing Sheets

(56) References Cited

U.S. PATENT DOCUMENTS

| | | |
|---|---|---|
| 2017/0166011 A1 | 6/2017 | Michoud et al. |
| 2017/0174006 A1 | 6/2017 | Michoud et al. |
| 2017/0362370 A1 | 12/2017 | Doisneau et al. |
| 2018/0009972 A1 | 1/2018 | Doisneau et al. |
| 2018/0016433 A1 | 1/2018 | Doisneau et al. |
| 2018/0118983 A1 | 5/2018 | Doisneau et al. |
| 2018/0273670 A1 | 9/2018 | Thuilliez et al. |
| 2018/0362754 A1 | 12/2018 | Thuilliez et al. |
| 2019/0077952 A1 | 3/2019 | Thuilliez et al. |
| 2019/0112512 A1 | 4/2019 | Doisneau et al. |
| 2019/0119412 A1 | 4/2019 | Ugolnikov et al. |
| 2019/0119535 A1 | 4/2019 | Doisneau |
| 2019/0145493 A1 | 5/2019 | Doisneau et al. |
| 2019/0177532 A1 | 6/2019 | Thuilliez et al. |

FOREIGN PATENT DOCUMENTS

| | | | |
|---|---|---|---|
| WO | 02/10269 A2 | 2/2002 | |
| WO | 03/016387 A1 | 2/2003 | |
| WO | 2006/069792 A1 | 7/2006 | |
| WO | 2006/069793 A1 | 7/2006 | |
| WO | 2013/017421 A1 | 2/2013 | |
| WO | 2013/017422 A1 | 2/2013 | |
| WO | 2013/017423 A1 | 2/2013 | |
| WO | 2015/007641 A1 | 1/2015 | |
| WO | 2015/007642 A1 | 1/2015 | |
| WO | WO-2015007641 A1 * | 1/2015 | ............. B32B 25/10 |

\* cited by examiner

HIGH STIFFNESS RUBBER COMPOSITION

BACKGROUND

The invention relates to a rubber composition, to a process for the manufacture of this composition, to a rubber composite and to a tyre.

It is known to use, in some parts of the tyres, rubber compositions exhibiting a high stiffness during small strains of the tyre. Resistance to small strains is one of the properties which a tyre has to exhibit in order to respond to the stresses to which it is subjected.

A high stiffness can be obtained by using a "concentrated" vulcanization system, that is to say comprising in particular relatively high contents of sulfur and of vulcanization accelerator.

However, such a concentrated vulcanization system is disadvantageous to the ageing in the raw state of the composition. Thus, when the composition is in the form of a semi-finished product, for example of a rubber tread, the sulfur may migrate into the surface of the semi-finished product. This phenomenon, known as blooming, has a detrimental effect on the green tack of the semi-finished product during the prolonged storage thereof, with, as consequence, a deterioration in the adhesion between the semi-finished products during the manufacture of the tyre.

Furthermore, storage of the raw composition containing a concentrated vulcanization system is liable to lead to a reduction in the delay phase of the composition during the vulcanization thereof, that is to say the time preceding the start of the vulcanization. Consequently, the composition may begin to cure prematurely in certain forming tools and the vulcanization kinetics are liable to be altered and the vulcanization efficiency to be reduced.

Such a concentrated vulcanization system also detrimentally affects the ageing in the cured state. Indeed a deterioration in the mechanical properties of the cured composition is observed, in particular at the limits, for example in the elongation at break.

A high stiffness may otherwise be obtained by increasing the content of reinforcing filler.

However, in a known way, increasing the stiffness of a rubber composition by increasing the content of filler may detrimentally affect the hysteresis properties and thus the rolling resistance properties of tyres. In point of fact, it is an ongoing aim to lower the rolling resistance of tyres in order to reduce the consumption of fuel and thus to protect the environment.

Finally, a high stiffness can be obtained by incorporating certain reinforcing resins, as disclosed in WO 02/10269.

Conventionally, the increase in the stiffness is obtained by incorporating reinforcing resins based on a methylene acceptor/donor system. The terms "methylene acceptor" and "methylene donor" are well known to a person skilled in the art and are widely used to denote compounds capable of reacting together to generate, by condensation, a three-dimensional reinforcing resin which will become superimposed and interpenetrated with the reinforcing filler/elastomer network, on the one hand, and with the elastomer/sulfur network, on the other hand (if the crosslinking agent is sulfur). The methylene acceptor is combined with a hardener, capable of crosslinking it or hardening it, also commonly known as "methylene donor". Examples of such a methylene acceptor and donor are described in WO 02/10269.

The methylene donors conventionally used in rubber compositions for tyres are hexamethylenetetramine (abbreviated to HMT) or hexamethoxymethylmelamine (abbreviated to HMMM or H3M) or hexaethoxymethylmelamine.

The methylene acceptors conventionally used in rubber compositions for tyres are pre-condensed phenolic resins.

However, the combination of phenolic resin, conventionally used as methylene acceptor, with HMT or H3M as methylene donor produces formaldehyde during the vulcanization of the rubber composition. In point of fact, it is desirable to reduce, indeed even to eliminate, in the long run, formaldehyde from rubber compositions due to the environmental impact of these compounds and the recent developments in regulations, in particular European regulations, relating to this type of compound.

It is an aim of the invention to provide a rubber composition which is stiffened by means of compounds having a low environmental impact.

Summary

To this end, a subject-matter of the invention is a rubber composition comprising at least one resin based:
A1) on at least one aromatic compound comprising at least one aromatic ring bearing at least two functional groups, one of these functional groups being a hydroxymethyl functional group and the other being an aldehyde functional group or a hydroxymethyl functional group; and
A2) on at least one phenolic compound chosen from:
A21) at least one aromatic polyphenol comprising at least one aromatic ring bearing at least two hydroxyl functional groups in the meta position with respect to one another, the two positions ortho to at least one of the hydroxyl functional groups being unsubstituted,
A22) at least one aromatic monophenol comprising at least one six-membered aromatic ring bearing a single hydroxyl functional group,
the two positions ortho to the hydroxyl functional group being unsubstituted or
at least one position ortho to and the position para to the hydroxyl functional group being unsubstituted,
and their mixtures.

Unexpectedly, the Applicants have discovered, during their research studies, that the aromatic compounds A1 of the composition according to the invention make it possible to avoid the production of formaldehyde, unlike conventional methylene donors. The Applicants have discovered, during their research studies, that an aromatic compound comprising at least two functional groups, including at least one hydroxymethyl functional group, could, with a phenolic compound, form an alternative resin to the reinforcing resins based on a methylene acceptor/donor system.

In addition, the specific combination of the aromatic compounds A1 and of the phenolic compounds A2 of the composition according to the invention makes it possible to obtain rubber compositions exhibiting an equivalent, indeed even greatly improved, low-strain stiffness with respect to conventional rubber compositions which comprise HMT or H3M methylene donors and a superior low-strain stiffness with respect to a rubber composition devoid of reinforcing resin.

Furthermore, the specific combination of the aromatic compounds A1 and of the phenolic compounds A2 of the composition according to the invention makes it possible to conceive rubber compositions exhibiting a satisfactory maintenance of stiffness with the increase in the temperature, in any case better than a rubber composition devoid of reinforcing resin.

The expression "resin based on" should, of course, be understood as meaning a resin comprising the mixture and/or the product of the reaction between the various base constituents used for the final condensation of this resin, preferably only the product of the reaction between the various base constituents used for this resin, it being possible for some of them to be intended to react or capable of reacting with one another or with their immediate chemical surroundings, at least partly, during the various phases of the process for the manufacture of the composition, of the composites or of the tyre, in particular during a curing step. Thus, the base constituents are the reactants intended to react together during the final condensation of the resin and are not reactants intended to react together to form these base constituents.

In accordance with the invention, the base constituents thus comprise at least one aromatic compound A1 and at least one phenolic compound A2. In one embodiment, the base constituents can comprise other additional constituents different from the aromatic compound A1 and from the phenolic compound A2. In another embodiment, the base constituents are constituted of at least one aromatic compound A1 and of at least one phenolic compound A2.

Preferably, in the embodiment where the base constituents comprise other additional constituents, these other additional constituents are devoid of formaldehyde and/or devoid of methylene donor selected from the group consisting of hexamethylenetetramine (HMT), hexamethoxymethylmelamine (H3M), hexaethoxymethylmelamine, lauryloxymethylpyridinium chloride, ethoxymethylpyridinium chloride, polymers of hexamethoxymethylmelamine of trioxane of formaldehyde, hexakis(methoxymethyl)melamine, N,N',N"-trimethyl-N,N',N"-trimethylolmelamine, hexamethylolmelamine, N-methylolmelamine, N,N'-dimethylolmelamine, N,N',N"-tris(methoxymethyl)melamine, N,N',N"-tributyl-N,N',N"-trimethylolmelamine. More advantageously, these other additional constituents are devoid of formaldehyde and devoid of the methylene donors described in this paragraph.

More preferably, in the embodiment where the base constituents comprise other additional constituents, these other additional constituents are devoid of formaldehyde and/or devoid of methylene donor selected from the group consisting of hexamethylenetetramine, hexaethoxymethylmelamine, hexamethoxymethylmelamine, lauryloxymethylpyridinium chloride, ethoxymethylpyridinium chloride, hexamethoxymethylmelamine of trioxane and the N-substituted oxymethylmelamines corresponding to the general formula:

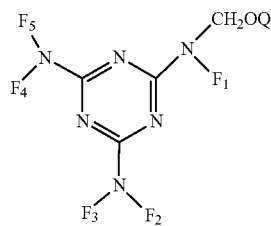

in which Q represents an alkyl group containing from 1 to 8 carbon atoms; $F_1$, $F_2$, $F_3$, $F_4$ and $F_5$ are selected, independently of one another, from the group consisting of a hydrogen atom, of an alkyl group containing from 1 to 8 carbon atoms, of the —$CH_2OQ$ group and their condensation products. More advantageously, these other additional constituents are devoid of formaldehyde and devoid of the methylene donors described in this paragraph.

More preferably still, in the embodiment where the base constituents comprise other additional constituents, these other additional constituents are devoid of formaldehyde and/or devoid of methylene donor. More advantageously, these other additional constituents are devoid of formaldehyde and devoid of methylene donors.

Devoid of formaldehyde or devoid of methylene donor is understood to mean that the total content by weight of formaldehyde or of methylene donor or donors belonging to the groups described above, by total weight of the aromatic compound or compounds A1 in the base constituents, is less than or equal to 10%, preferably less than or equal to 5%, more preferably less than or equal to 2% and more preferably still less than or equal to 1%.

Devoid of formaldehyde and devoid of methylene donor is understood to mean that the total content by weight of formaldehyde and of methylene donor or donors belonging to the groups described above, by total weight of the aromatic compound or compounds A1 in the base constituents, is less than or equal to 10%, preferably less than or equal to 5%, more preferably less than or equal to 2% and more preferably still less than or equal to 1%.

"Meta position with respect to one another" will be understood to mean that the functional groups targeted, for example the hydroxyl functional groups in the aromatic polyphenol, are borne by carbons of the aromatic ring which are separated from one another by a single other carbon of the aromatic ring.

"Para position with respect to one another" will be understood to mean that the functional groups targeted are opposite one another, that is to say in the 1 and 4 positions of the 6-membered aromatic ring. Analogously, "the para position" with respect to a functional group is a position opposite the functional group on the 6-membered aromatic ring bearing the functional group.

"In the ortho position to a functional group" will be understood to mean the position occupied by the carbon of the aromatic ring which is immediately adjacent to the carbon of the aromatic ring bearing the functional group. Analogously, "the ortho position" with respect to a functional group is the position adjacent to the functional group on the aromatic ring bearing the functional group.

"Member" of a ring will be understood to mean a constituent atom of the backbone of the ring. Thus, for example, a benzene ring comprises six members, each member consisting of a carbon atom. In another example, a furan ring comprises five members, four members each consisting of a carbon atom and the remaining member consisting of an oxygen atom.

"CHO" represents the aldehyde functional group.

"$CH_2OH$" represents the hydroxymethyl functional group.

The "compound A1" denotes, within the context of the invention, the aromatic compound defined in section 1.1.

The "compound A2" denotes, within the context of the invention, the compound A21 and/or the compound A22.

The "compound A21" denotes, within the context of the invention, the aromatic polyphenol defined in section 1.2.

"Aromatic polyphenol" is understood to mean an aromatic compound comprising at least one benzene ring bearing more than one hydroxyl functional group.

The "compound A22" denotes, within the context of the invention, the aromatic monophenol defined in section 1.2.

Within the context of the invention, the carbon products mentioned in the description may be of fossil or biosourced origin. In the latter case, they may partially or completely result from biomass or be obtained from renewable starting materials resulting from biomass.

The rubber composition thus comprises at least one (that is to say, one or more) crosslinked reinforcing resin, this reinforcing resin being constituted by the resin according to the invention; this resin being based on at least one (that is to say, one or more) aromatic compound A1 and at least one (that is to say, one or more) phenolic compound A2, which constituents will be described in detail below.

Another subject-matter of the invention is a rubber composition comprising:
A1) at least one aromatic compound comprising at least one aromatic ring bearing at least two functional groups, one of these functional groups being a hydroxymethyl functional group and the other being an aldehyde functional group or a hydroxymethyl functional group; and
A2) at least one phenolic compound chosen from:
  A21) at least one aromatic polyphenol comprising at least one aromatic ring bearing at least two hydroxyl functional groups in the meta position with respect to one another, the two positions ortho to at least one of the hydroxyl functional groups being unsubstituted;
  A22) at least one aromatic monophenol comprising at least one six-membered aromatic ring bearing a single hydroxyl functional group,
    the two positions ortho to the hydroxyl functional group being unsubstituted or
    at least one position ortho to and the position para to the hydroxyl functional group being unsubstituted;
  and their mixtures.

Another subject-matter of the invention is a process for the manufacture of a rubber composition in the raw state, comprising a step of mixing:
A1) at least one aromatic compound comprising at least one aromatic ring bearing at least two functional groups, one of these functional groups being a hydroxymethyl functional group and the other being an aldehyde functional group or a hydroxymethyl functional group; and
A2) at least one phenolic compound chosen from:
  A21) at least one aromatic polyphenol comprising at least one aromatic ring bearing at least two hydroxyl functional groups in the meta position with respect to one another, the two positions ortho to at least one of the hydroxyl functional groups being unsubstituted,
  A22) at least one aromatic monophenol comprising at least one six-membered aromatic ring bearing a single hydroxyl functional group,
    the two positions ortho to the hydroxyl functional group being unsubstituted or
    at least one position ortho to and the position para to the hydroxyl functional group being unsubstituted,
  their mixtures; and
  at least one elastomer.

Another subject-matter of the invention is a process for the manufacture of a rubber composition in the cured state, comprising:
  a step of manufacture of a rubber composition in the raw state comprising a step of mixing:
    A1) at least one aromatic compound comprising at least one aromatic ring bearing at least two functional groups, one of these functional groups being a hydroxymethyl functional group and the other being an aldehyde functional group or a hydroxymethyl functional group; and
    A2) at least one phenolic compound chosen from:
      A21) at least one aromatic polyphenol comprising at least one aromatic ring bearing at least two hydroxyl functional groups in the meta position with respect to one another, the two positions ortho to at least one of the hydroxyl functional groups being unsubstituted,
      A22) at least one aromatic monophenol comprising at least one six-membered aromatic ring bearing a single hydroxyl functional group,
        the two positions ortho to the hydroxyl functional group being unsubstituted or
        at least one position ortho to and the position para to the hydroxyl functional group being unsubstituted,
      and their mixtures,
  then, a step of shaping the rubber composition in the raw state,
  then, a step of crosslinking, for example by vulcanization or curing, the rubber composition during which a resin based on the phenolic compound A2 and on the aromatic compound A1 is crosslinked.

Preferably, during the mixing step, at least one elastomer is also mixed with the composition.

Yet another subject-matter of the invention is a rubber composition capable of being obtained by a process as described above.

Another subject-matter of the invention is a rubber composite reinforced with at least one reinforcing element embedded in a rubber composition as described above.

Another subject-matter of the invention is a tyre comprising a rubber composition as described above or a rubber composite as described above.

DETAILED DESCRIPTION

Figure 1:
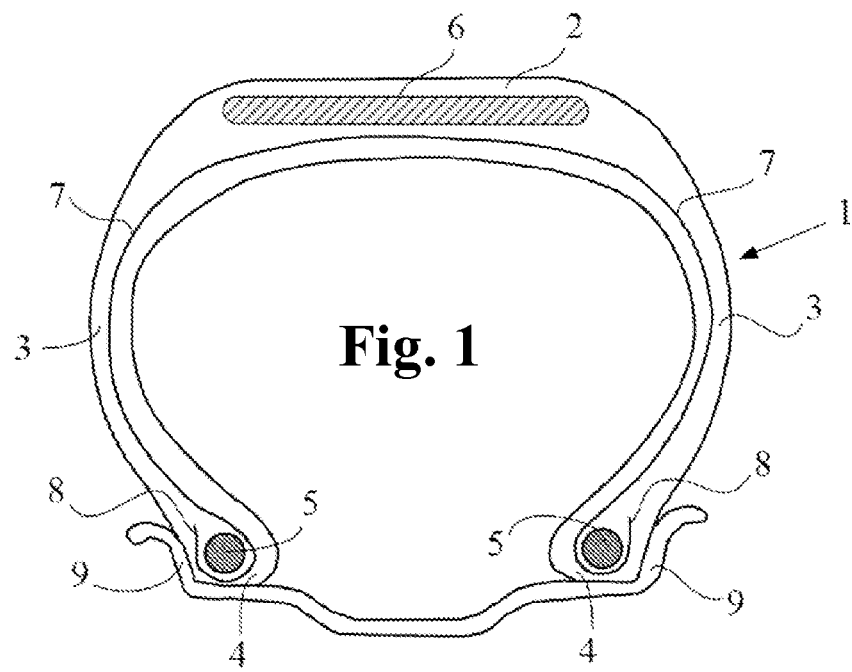
FIG. 1 represents diagrammatically (without observing a specific scale) a radial section of a tyre in accordance with the invention for a vehicle of the heavy-duty type.

Rubber composition is understood to mean that the composition comprises at least one elastomer or one rubber (the two terms being synonyms) and at least one other component. A rubber composition thus comprises a matrix of elastomer or of rubber in which at least the other component is dispersed. A rubber composition is in a plastic state in the raw (non-crosslinked) state and in an elastic state in the cured (crosslinked) state but under no circumstances in a liquid state. A rubber composition must not be confused with an elastomer latex, which is a composition in a liquid state comprising a liquid solvent, generally water, and at least one elastomer or one rubber dispersed in the liquid solvent so as to form an emulsion. Thus, the rubber composition is not an aqueous adhesive composition.

In the present description, unless expressly indicated otherwise, all the percentages (%) shown are percentages by weight. The acronym "phr" means parts by weight per hundred parts of elastomer.

Furthermore, any interval of values denoted by the expression "between a and b" represents the range of values extending from more than a to less than b (that is to say, limits a and b excluded), whereas any interval of values denoted by the expression "from a to b" means the range of values extending from the limit "a" up to the limit "b" (that is to say including the strict limits "a" and "b").

I.1-Aromatic Compound A1 of the Rubber Composition

The first essential constituent of the resin is an aromatic compound comprising at least one aromatic ring bearing at least two functional groups, one of these functional groups being a hydroxymethyl functional group and the other being an aldehyde functional group or a hydroxymethyl functional group. Thus, in accordance with the invention, it is the said aromatic ring which bears hydroxymethyl and aldehyde functional groups. The compound according to the invention thus corresponds to the general formula (I):

(I)

where Ar represents an aromatic ring and B represents CHO or $CH_2OH$.

The aromatic ring is advantageously a 5- or 6-membered ring comprising, as members, carbon atoms and optionally one or more heteroatoms, in particular nitrogen, oxygen or sulfur atoms, optionally oxidized in the N-oxide or S-oxide form. In one alternative form, the aromatic ring comprises 0, 1 or 2 heteroatom(s). The remainder of the aromatic ring can be substituted or unsubstituted.

The aromatic ring can bear 0, 1 or 2 aldehyde functional groups, advantageously 0 or 1 aldehyde functional group.

The aromatic ring can bear 1, 2 or 3 hydroxymethyl functional groups, advantageously 1 or 2 hydroxymethyl functional groups.

In addition, the aromatic ring can also bear 0, 1 or 2 other functional group(s), in particular hydroxyl functional group(s).

In the embodiment in which the aromatic ring is a 6-membered ring, the B and hydroxymethyl functional groups are advantageously in the meta or para position with respect to one another.

In the embodiment in which the aromatic ring is a 5-membered ring, the ring can comprise one or more heteroatoms, in particular nitrogen, oxygen or sulfur atoms, optionally oxidized in the N-oxide or S-oxide form. Advantageously, the aromatic ring comprises 1 or 2 heteroatom(s), preferably 1 heteroatom.

In this embodiment, in which the aromatic ring is a 5-membered ring, at least one of the three following conditions is met:
- the aromatic ring comprises 0 or a single aldehyde functional group;
- the aromatic ring comprises one or two hydroxymethyl functional groups;
- apart from the aldehyde and hydroxymethyl functional groups, the remainder of the aromatic ring is unsubstituted.

Advantageously, these three conditions are met.

In a first case, the aromatic ring comprises:
- a single aldehyde functional group;
- a single hydroxymethyl functional group;
- apart from the aldehyde and hydroxymethyl functional groups, the remainder of the aromatic ring is unsubstituted.

In a second case, the aromatic ring comprises:
- 0 aldehyde functional group;
- two hydroxymethyl functional groups;
- apart from the hydroxymethyl functional groups, the remainder of the aromatic ring is unsubstituted.

Advantageously, the compound is of general formula (II):

(II)

in which B represents CHO or $CH_2OH$, X represents O, $NR_1$, NO, S, SO, $SO_2$ or $SR_2R_3$, $R_1$ represents a hydrogen or an alkyl, aryl, arylalkyl, alkylaryl or cycloalkyl group and $R_2$ and $R_3$ each represent, independently of one another, a hydrogen or an alkyl, aryl, arylalkyl, alkylaryl or cycloalkyl group.

Advantageously, the compound is of general formula (II):

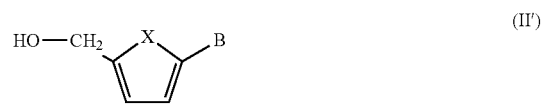
(II')

in which X and B are as defined above.

According to a particularly advantageous embodiment, B represents CHO. In another embodiment, B represents $CH_2OH$.

According to a preferred embodiment, X represents O.

In one alternative form, the compound is of formula (IIa):

(IIa)

B being as defined above,
and more particularly of formula (II'a1) or (II'a2):

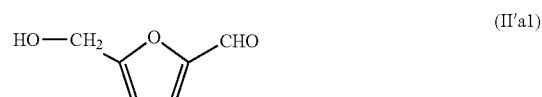
(II'a1)

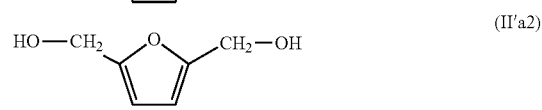
(II'a2)

5-(Hydroxymethyl)furfural (II'a1) is a particularly suitable aldehyde, given that this organic compound can be readily derived from renewable resources. Specifically, it is derived in particular from the dehydration of certain sugars, such as fructose, glucose, sucrose, cellulose and inulin.

In another embodiment, X represents $NR_1$ or NO, advantageously $NR_1$. $R_1$ is as defined above.

In one alternative form, the compound is of formula (IIb):

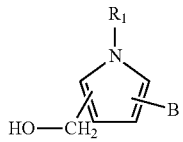
(IIb)

B being as defined above,
and more particularly of formula (II'b1) or (II'b2):

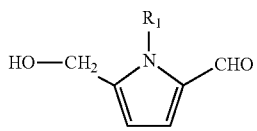
(II'b1)

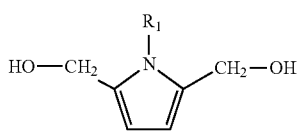
(II'b2)

in which $R_1$ represents a hydrogen or an alkyl, aryl, arylalkyl, alkylaryl or cycloalkyl group. Advantageously, $R_1$ represents a hydrogen or a $C_1$-$C_6$ alkyl group.

In another embodiment, X represents S, SO, $SO_2$ or $SR_2R_3$.

In one alternative form, the compound is of formula (IIc):
B being as defined above,

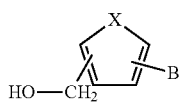
(IIc)

with X represents S, $SR_2R_3$, SO or $SO_2$ and $R_2$ and $R_3$ each represent, independently of one another, a hydrogen or an alkyl, aryl, arylalkyl, alkylaryl or cycloalkyl group, B being as defined above;
and more particularly of formula (II'c1) or (II'c2):

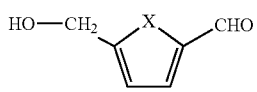
(II'c1)

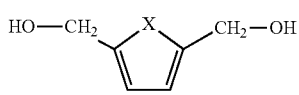
(II'c2)

in which X represents S, $SR_2R_3$, SO or $SO_2$ and $R_2$ and $R_3$ each represent, independently of one another, a hydrogen or an alkyl, aryl, arylalkyl, alkylaryl or cycloalkyl group.

The compound can thus be:

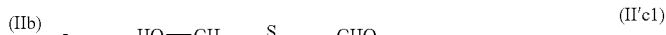
(II'c1)

(II'c2)

(II'c3)

(II'c4)

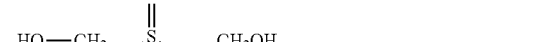
(II'c5)

(II'c6)

(II'c7)

(II'c8)

Advantageously, $R_2$ and $R_3$ each represent, independently of one another, a $C_1$-$C_6$ alkyl radical.

The compound is advantageously of formula (II'c1) or (II'c2).

In another alternative form, the aromatic ring is a 6-membered ring, which can comprise 0, one or more heteroatoms, in particular nitrogen, optionally oxidized in the N-oxide form. In one alternative form, the aromatic ring comprises 0, 1 or 2 heteroatom(s).

The B and hydroxymethyl functional groups are advantageously in the meta or para position with respect to one another.

The aromatic ring can bear 0, 1 or 2 aldehyde functional groups, advantageously 0 or 1 aldehyde functional group.

The aromatic ring can bear 1, 2 or 3 hydroxymethyl functional groups, advantageously 1 or 2 hydroxymethyl functional groups.

In addition, the aromatic ring can also bear 0, 1 or 2 other functional group(s), in particular hydroxyl functional group(s).

Advantageously, the compound is of general formula (III):

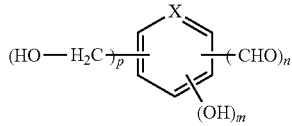

(III)

in which X represents C or $NR_1$, n has the value 0, 1 or 2, m has the value 0 or 1 and p has the value 1, 2 or 3. $R_1$ represents a hydrogen or an alkyl, aryl, arylalkyl, alkylaryl or cycloalkyl group. In accordance with the invention, p+n>1 with p>0.

Advantageously, $R_1$ represents a hydrogen or a $C_1$-$C_6$ alkyl group.

In one alternative form, n has the value 1, m has the value 0 and p has the value 1.

In another alternative form, n has the value 1, m has the value 1 and p has the value 1.

In another alternative form, n has the value 2, m has the value 1 and p has the value 1.

In another alternative form, n has the value 1, m has the value 1 and p has the value 2.

In another alternative form, n has the value 0, m has the value 0 and p has the value 2.

In another alternative form, n has the value 0, m has the value 1 and p has the value 2.

In another alternative form, n has the value 1, m has the value 1 and p has the value 2.

In another alternative form, n has the value 0, m has the value 1 and p has the value 3.

Preferably, the aromatic ring of the compound of formula (III) is a benzene ring. More preferably, this compound of formula (III) is selected from the group consisting of 2-(hydroxymethyl)benzene-1-carboxaldehyde, 3-(hydroxymethyl)benzene-1-carboxaldehyde, 4-(hydroxymethyl)benzene-1-carboxaldehyde, 3-hydroxymethyl-6-hydroxybenzene-1-carboxaldehyde, 3-hydroxymethyl-4-hydroxybenzene-1-carboxaldehyde, 3-hydroxymethyl-2-hydroxybenzene-1-carboxaldehyde, 3-hydroxymethyl-2-hydroxybenzene-1,5-dicarboxaldehyde, 5-hydroxymethyl-2-hydroxybenzene-1,3-dicarboxaldehyde, 3,5-dihydroxymethyl-4-hydroxybenzene-1-carboxaldehyde, 3,5-dihydroxymethyl-2-hydroxybenzene-1-carboxaldehyde, 1,2-dihydroxymethylbenzene, 1,3-dihydroxymethylbenzene, 1,4-dihydroxymethylbenzene, 1,3-dihydroxymethyl-6-hydroxybenzene, 1,3-dihydroxymethyl-4-hydroxybenzene, 1,3-dihydroxymethyl-2-hydroxybenzene, 1,3,5-trihydroxymethyl-2-hydroxybenzene, 1,3-dihydroxymethyl-6-hydroxybenzene, 1,3,5-trihydroxymethyl-4-hydroxybenzene, 1,3,2-trihydroxymethyl-2-hydroxybenzene and the mixtures of these compounds.

More preferably still, the aromatic compound used is 1-(hydroxymethyl)benzene-4-carboxaldehyde of formula (IIIa) or 1,4-dihydroxymethylbenzene of formula (IIIb):

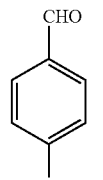

(IIIa)

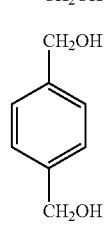

(IIIb)

Preferably, the composition is devoid of formaldehyde and/or devoid of methylene donor selected from the group consisting of hexamethylenetetramine (HMT), hexamethoxymethylmelamine (H3M), hexaethoxymethylmelamine, lauryloxymethylpyridinium chloride, ethoxymethylpyridinium chloride, polymers of hexamethoxymethylmelamine of trioxane of formaldehyde, hexakis(methoxymethyl)melamine, N,N',N"-trimethyl-N,N',N"-trimethylolmelamine, hexamethylolmelamine, N-methylolmelamine, N,N'-dimethylolmelamine, N,N',N"-tris(methoxymethyl)melamine, N,N',N"-tributyl-N,N',N"-trimethylolmelamine. More advantageously, the composition is devoid of formaldehyde and devoid of the methylene donors described in this paragraph.

More preferably, the composition is devoid of formaldehyde and/or devoid of methylene donor selected from the group consisting of hexamethylenetetramine, hexaethoxymethylmelamine, hexamethoxymethylmelamine, lauryloxymethylpyridinium chloride, ethoxymethylpyridinium chloride, hexamethoxymethylmelamine of trioxane and the N-substituted oxymethylmelamines corresponding to the general formula:

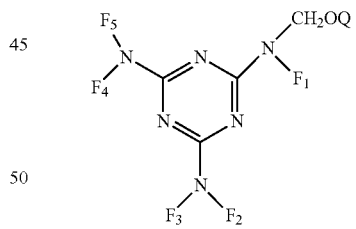

in which Q represents an alkyl group containing from 1 to 8 carbon atoms; $F_1$, $F_2$, $F_3$, $F_4$ and $F_5$ are selected, independently of one another, from the group consisting of a hydrogen atom, of an alkyl group containing from 1 to 8 carbon atoms, of the —$CH_2OQ$ group and their condensation products. More advantageously, the composition is devoid of formaldehyde and devoid of the methylene donors described in this paragraph.

More preferably still, the composition is devoid of formaldehyde and/or devoid of methylene donor. More advantageously, the composition is devoid of formaldehyde and devoid of methylene donors.

Devoid of formaldehyde or devoid of methylene donor is understood to mean that the total content by weight of formaldehyde or of methylene donor or donors belonging to the groups described above, by total weight of the aromatic compound or compounds A1 in the composition, is less than or equal to 10%, preferably less than or equal to 5%, more preferably less than or equal to 2% and more preferably still less than or equal to 1%.

Devoid of formaldehyde and devoid of methylene donor is understood to mean that the total content by weight of formaldehyde and of methylene donor or donors belonging to the groups described above, by total weight of the aromatic compound or compounds A1 in the composition, is less than or equal to 10%, preferably less than or equal to 5%, more preferably less than or equal to 2% and more preferably still less than or equal to 1%.

I.2-Phenolic Compound A2 of the Rubber Composition: Aromatic Polyphenol and/or Aromatic Monophenol—Compounds A21 and/or A22

In one embodiment, the second essential constituent of the resin is an aromatic polyphenol A21 comprising one or more aromatic ring(s). The aromatic polyphenol comprises at least one aromatic ring bearing at least two hydroxyl functional groups in the meta position with respect to one another, the two positions ortho to at least one of the hydroxyl functional groups being unsubstituted.

In another embodiment, the second essential constituent of the resin is an aromatic monophenol A22 comprising at least one six-membered aromatic ring bearing a single hydroxyl functional group. On this aromatic monophenol, the two positions ortho to the hydroxyl functional group are unsubstituted, or else at least one position ortho to and the position para to the hydroxyl functional group are unsubstituted.

In yet another embodiment, the second essential constituent is a mixture of the aromatic polyphenol A21 and of the aromatic monophenol A22 as are described above.

In accordance with the invention, the compound A21 can be, in one embodiment, a simple molecule of aromatic polyphenol comprising one or more aromatic rings, at least one of these aromatic rings, indeed even each aromatic ring, bearing at least two hydroxyl functional groups in the meta position with respect to one another, the two positions ortho at least one of the hydroxyl functional groups being unsubstituted.

Analogously, the compound A22 can be, in one embodiment, a simple molecule of aromatic monophenol comprising one or more six-membered aromatic rings, at least one of these six-membered aromatic rings, indeed even each six-membered aromatic ring, bearing a single hydroxyl functional group, the two positions ortho to the hydroxyl functional group are unsubstituted, or else at least one position ortho to and the position para to the hydroxyl functional group are unsubstituted.

Such simple molecules do not comprise a repeat unit.

In accordance with the invention, the compound A21 can be, in another embodiment, a pre-condensed resin based:
  on at least one aromatic polyphenol comprising at least one aromatic ring bearing at least two hydroxyl functional groups in the meta position with respect to one another, the two positions ortho to at least one of the hydroxyl functional groups being unsubstituted; and
  on at least one compound capable of reacting with the polyphenol comprising at least one aldehyde functional group and/or at least one compound capable of reacting with the polyphenol comprising at least two hydroxymethyl functional groups borne by an aromatic ring.

Such a pre-condensed resin based on aromatic polyphenol is in accordance with the invention and comprises, unlike the simple molecule described above, a repeat unit. In the case in point, the repeat unit comprises at least one aromatic ring bearing at least two hydroxyl functional groups in the meta position with respect to one another.

Analogously and in accordance with the invention, the compound A22 can be, in another embodiment, a pre-condensed resin based:
  on at least one aromatic monophenol comprising at least one six-membered aromatic ring bearing a single hydroxyl functional group:
    the two positions ortho to the hydroxyl functional group are unsubstituted, or
    at least one position ortho to and the position para to the hydroxyl functional group are unsubstituted;
  on at least one compound capable of reacting with the monophenol comprising at least one aldehyde functional group and/or at least one compound capable of reacting with the monophenol comprising at least two hydroxymethyl functional groups borne by an aromatic ring.

Such a pre-condensed resin based on aromatic monophenol is in accordance with the invention and comprises, unlike the simple molecule described above, a repeat unit. In the case in point, the repeat unit comprises at least one six-membered aromatic ring bearing a single hydroxyl functional group.

In another embodiment, the compound A21 is a mixture of an aromatic polyphenol forming a simple molecule and of a pre-condensed resin based on aromatic polyphenol.

In another embodiment, the compound A22 is a mixture of an aromatic monophenol forming a simple molecule and of a pre-condensed resin based on aromatic monophenol.

In the specific embodiments which follow, the aromatic ring(s) of the aromatic polyphenol and/or of the aromatic monophenol are described. For the sake of clarity, the "aromatic polyphenol" and/or the "aromatic monophenol" is/are described therein in its simple molecule form. This aromatic polyphenol and/or this aromatic monophenol can subsequently be condensed and will in part define the repeat unit. The characteristics of the pre-condensed resin are described in more detail subsequently.

Aromatic Polyphenol A21

In a preferred embodiment, the aromatic ring of the aromatic polyphenol bears three hydroxyl functional groups in the meta position with respect to one another.

Preferably, the two positions ortho to each hydroxyl functional group are unsubstituted. This is understood to mean that the two carbon atoms located on either side of (in the position ortho to) the hydroxylated carbon atom (i.e. bearing the hydroxyl functional group) bear a simple hydrogen atom.

More preferably still, the remainder of the aromatic ring of the aromatic polyphenol is unsubstituted. This is understood to mean that the other carbon atoms of the remainder of the aromatic ring (those other than the carbon atoms bearing the hydroxyl functional groups) bear a simple hydrogen atom.

In one embodiment, the aromatic polyphenol comprises several aromatic rings, at least two of them each bearing at least two hydroxyl functional groups in the meta position with respect to one another, the two positions ortho to at least one of the hydroxyl functional groups of at least one aromatic ring being unsubstituted.

In a preferred embodiment, at least one of the aromatic rings of the aromatic polyphenol bears three hydroxyl functional groups in the meta position with respect to one another.

Preferably, the two positions ortho to each hydroxyl functional group of at least one aromatic ring are unsubstituted.

More preferably still, the two positions ortho to each hydroxyl functional group of each aromatic ring are unsubstituted.

More preferably still, the remainder of each of the aromatic rings is unsubstituted. This is understood to mean that the other carbon atoms of the remainder of each aromatic ring (those other than the carbon atoms bearing the hydroxyl functional groups or bearing the group connecting the aromatic rings together) bear a simple hydrogen atom.

Advantageously, the aromatic ring bearing at least two hydroxyl functional groups in the meta position with respect to one another, the two positions ortho to at least one of the hydroxyl functional groups being unsubstituted, is a benzene ring.

Advantageously, each aromatic ring of the aromatic polyphenol is a benzene ring.

Mention may in particular be made, as example of aromatic polyphenol comprising just one aromatic ring, of resorcinol and phloroglucinol as a reminder of expanded formulae (IV) and (V):

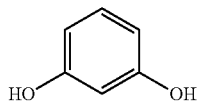

(IV)

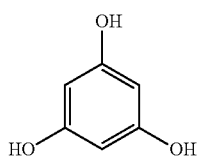

(V)

By way of examples, in the case where the aromatic polyphenol comprises several aromatic rings, at least two of these aromatic rings, which are identical or different, are selected from those of general formulae:

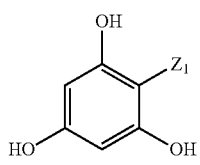

(VI-a)

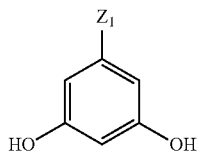

(VI-b)

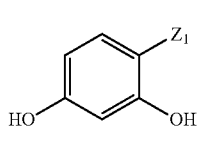

(VI-c)

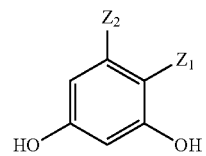

(VI-d)

in which the $Z_1$ and $Z_2$ symbols, which are identical or different, if there are several of them on the same aromatic ring, represent an atom (for example carbon, sulfur or oxygen) or a connecting group, by definition at least divalent, which connects at least these two aromatic rings to the remainder of the aromatic polyphenol.

Another example of aromatic polyphenol is 2,2',4,4'-tetrahydroxydiphenyl sulfide of following expanded formula (VII):

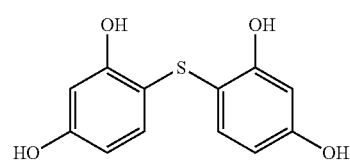

(VII)

Another example of aromatic polyphenol is 2,2',4,4'-tetrahydroxybenzophenone of following expanded formula (VIII):

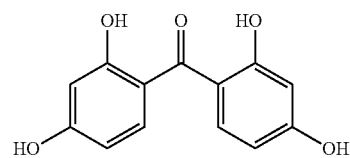

(VIII)

It is noted that each compound VII and VIII is an aromatic polyphenol comprising two aromatic rings (of formulae VI-c), each of which bears at least two (in the case in point two) hydroxyl functional groups in the meta position with respect to one another.

It is noted, in the case of an aromatic polyphenol comprising at least one aromatic ring in accordance with the formula VI-b, that the two positions ortho to each hydroxyl functional group of at least one aromatic ring are unsubstituted. In the case of an aromatic polyphenol comprising several aromatic rings in accordance with the formula VI-b, the two positions ortho to each hydroxyl functional group of each aromatic rings are unsubstituted.

According to one embodiment of the invention, the aromatic polyphenol is selected from the group consisting of resorcinol (IV), phloroglucinol (V), 2,2',4,4'-tetrahydroxydiphenyl sulfide (VII), 2,2',4,4'-tetrahydroxybenzophenone (VIII), resins pre-condensed from at least one of these phenols and the mixtures of these compounds. In a particularly advantageous embodiment, the aromatic polyphenol is phloroglucinol.

In one embodiment, the compound A21 comprises a pre-condensed resin based on the aromatic polyphenol as described in any one of these embodiments.

This pre-condensed resin is advantageously based:
- on at least one aromatic polyphenol as defined above, and preferably selected from the group consisting of resorcinol (IV), phloroglucinol (V), 2,2',4,4'-tetrahydroxydiphenyl sulphide (VII), 2,2',4,4'-tetrahydroxybenzophenone (VIII) and their mixtures; and
- on at least one compound capable of reacting with the polyphenol comprising at least one aldehyde functional group and/or at least one compound capable of reacting with the polyphenol comprising at least two hydroxymethyl functional groups borne by an aromatic ring.

The compound capable of reacting with the polyphenol comprising at least one aldehyde functional group and/or the compound capable of reacting with the polyphenol comprising at least two hydroxymethyl functional groups borne by an aromatic ring and can be an aromatic compound A1 as defined above in paragraph 1.1, a compound of formula Ar—(CHO)$_2$, where Ar is as defined above for the aromatic compound A1 of paragraph 1.1, or any other aldehyde. Advantageously, the said compound capable of reacting with the polyphenol comprising at least one aldehyde functional group and/or the said compound capable of reacting with the polyphenol comprising at least two hydroxymethyl functional groups borne by an aromatic ring is selected from the group consisting of an aromatic compound comprising an aromatic ring bearing at least two functional groups, one of these functional groups being a hydroxymethyl functional group and the other being an aldehyde functional group or a hydroxymethyl functional group, formaldehyde, benzaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, when the compound is an aromatic compound comprising an aromatic ring bearing at least two functional groups, one of these functional groups being a hydroxymethyl functional group and the other being an aldehyde functional group or a hydroxymethyl functional group, this compound is selected from the group consisting of 5-(hydroxymethyl)furfural, 2,5-di(hydroxymethyl)furan and the mixtures of these compounds.

Thus, in the pre-condensed resin based on aromatic polyphenol, the repeat unit meets the characteristics of the aromatic polyphenol which are defined above, with the exception that at least one of the carbon atoms of the aromatic ring, which was unsubstituted, is connected to another unit.

Whatever the compound other than the aromatic polyphenol at the basis of the pre-condensed resin, this pre-condensed resin is devoid of free formaldehyde. Indeed, even in the case where the pre-condensed resin is based on an aromatic polyphenol as described above and on formaldehyde, since the formaldehyde has already reacted with the aromatic polyphenol, the pre-condensed resin is devoid of free formaldehyde liable to be able to react with a compound A1 in accordance with the invention in a subsequent step.

The compound A21 can also comprise a mixture of a free molecule of aromatic polyphenol and of a pre-condensed resin based on aromatic polyphenol, as described above. In particular, the compound A21 can also comprise a mixture of phloroglucinol and of a pre-condensed resin based on phloroglucinol.

Aromatic Monophenol A22

The monophenol A22 can be in accordance with two alternative forms. In one alternative form, the two positions ortho to the hydroxyl functional group are unsubstituted. In another alternative form, at least one position ortho to and the position para to the hydroxyl functional group are unsubstituted.

Advantageously, in the alternative form in which at least one position ortho to and the position para to the hydroxyl functional group are unsubstituted, a single ortho position is unsubstituted and the position para to the hydroxyl functional group is unsubstituted.

Preferably, whatever the alternative form, the two positions ortho to the hydroxyl functional group are unsubstituted. This is understood to mean that the two carbon atoms located on either side of (in the position ortho to) the hydroxylated carbon atom (i.e. bearing the hydroxyl functional group) bear a simple hydrogen atom.

More preferably still, the remainder of the aromatic ring is unsubstituted. This is understood to mean that the other carbon atoms of the remainder of the aromatic ring (those other than the carbon atoms bearing the hydroxyl functional groups) bear a simple hydrogen atom.

In one embodiment, the aromatic monophenol comprises several six-membered aromatic rings, at least two of them each bearing a single hydroxyl functional group and, for at least one of the hydroxyl functional groups, the two positions ortho to the hydroxyl functional group are unsubstituted, or at least one position ortho to and the position para to the hydroxyl functional group are unsubstituted.

Preferably, the two positions ortho to each hydroxyl functional group of at least one six-membered aromatic ring are unsubstituted.

More preferably still, the two positions ortho to each hydroxyl functional group of each six-membered aromatic ring are unsubstituted.

More preferably still, the remainder of each of the aromatic rings is unsubstituted. This is understood to mean that the other carbon atoms of the remainder of each aromatic ring (those other than the carbon atoms bearing the hydroxyl functional groups or bearing the group which connects the aromatic rings together) bear a simple hydrogen atom.

Advantageously, the or each aromatic ring of the aromatic monophenol is a benzene ring.

Preferably, the aromatic monophenol is selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid and the mixtures of these compounds.

In one embodiment, the compound A22 comprises a pre-condensed resin based on the aromatic monophenol as described in any one of these embodiments.

This pre-condensed resin is advantageously based:
- on at least one aromatic monophenol as defined above, and preferably selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid and the mixtures of these compounds; and
- on at least one compound capable of reacting with the monophenol comprising at least one aldehyde functional group and/or at least one compound capable of reacting with the monophenol comprising at least two hydroxymethyl functional groups borne by an aromatic ring.

The compound capable of reacting with the monophenol comprising at least one aldehyde functional group and/or the compound capable of reacting with the monophenol comprising at least two hydroxymethyl functional groups borne by an aromatic ring and reacting with the said aromatic monophenol can be an aromatic compound A1 as defined above in paragraph 1.1, a compound of formula Ar—(CHO)$_2$, where Ar is as defined above for the aromatic compound A1 of paragraph 1.1, or any other aldehyde. Advantageously, the said compound capable of reacting with the monophenol comprising at least one aldehyde functional group and/or the said compound capable of reacting with the monophenol comprising at least two hydroxymethyl functional groups borne by an aromatic ring is selected from the group consisting of an aromatic compound comprising an aromatic ring bearing at least two functional groups, one of these functional groups being a hydroxymethyl functional group and the other being an aldehyde functional group or a hydroxymethyl functional group, formaldehyde, benzaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, when the compound is an aromatic compound comprising an aromatic ring bearing at least two functional groups, one of these functional groups being a hydroxymethyl functional group and the other being an aldehyde functional group or a hydroxymethyl functional group, this compound is selected from the group consisting of 5-(hydroxymethyl)furfural, 2,5-di(hydroxymethyl)furan and the mixtures of these compounds.

Thus, in the pre-condensed resin based on aromatic monophenol, the repeat unit meets the characteristics of the aromatic monophenol which are defined above, with the exception that at least one of the carbon atoms of the six-membered aromatic ring, which was unsubstituted, is connected to another unit.

Whatever the compound other than the aromatic monophenol at the basis of the pre-condensed resin, this pre-condensed resin is devoid of free formaldehyde. Indeed, even in the case where the pre-condensed resin is based on an aromatic monophenol as described above and on formaldehyde, since the formaldehyde has already reacted with the aromatic monophenol, the pre-condensed resin is devoid of free formaldehyde liable to be able to react with a compound A1 in accordance with the invention in a subsequent step.

The compound A22 can also comprise a mixture of a free molecule of aromatic monophenol and of a pre-condensed resin based on aromatic monophenol, as described above. In particular, the compound A22 can also comprise a mixture of phenol and of a pre-condensed resin based on phenol.

Rubber Composition According to the Invention

In some embodiments, depending on the use of the composition, use will be made of an amount of aromatic compound A1 ranging from 0.1 to 30 phr. Likewise, use will be made of an amount of phenolic compound A2 ranging from 0.1 to 30 phr.

In some embodiments, the [aromatic compound A1]:[phenolic compound A2] molar ratio advantageously varies from 3:1 to 1:1, advantageously from 3:1 to 1.5:1.

Depending on the use which is made of the composition, the rubber composition exhibits, in the cured state, a secant modulus at 10% elongation, MA10, measured according to Standard ASTM D 412 of 1998 (test specimen C), of greater than or equal to MPa, preferably of greater than or equal to 20 MPa, preferentially of greater than or equal to 30 MPa, more preferably of greater than or equal to 40 MPa and more preferably still of greater than or equal to 60 MPa.

Preferably, the rubber composition comprises a diene elastomer.

Elastomer or rubber (the two terms being synonyms) of the "diene" type is understood to mean, generally, an elastomer resulting, at least in part (i.e., a homopolymer or a copolymer), from diene monomers (monomers bearing two conjugated or unconjugated carbon-carbon double bonds).

Particularly preferably, the diene elastomer of the rubber composition is selected from the group consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs) and the mixtures of such copolymers.

The rubber compositions can contain just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Preferably, the rubber composition comprises a reinforcing filler.

When a reinforcing filler is used, use may be made of any type of reinforcing filler known for its abilities to reinforce a rubber composition which can be used for the manufacture of tyres, for example an organic filler, such as carbon black, a reinforcing inorganic filler, such as silica, or else a blend of these two types of filler, in particular a blend of carbon black and silica.

All the carbon blacks conventionally used in tyres ("tyre-grade" blacks) are suitable as carbon blacks. Mention will more particularly be made, for example, of the reinforcing carbon blacks of the 100, 200 or 300 series (ASTM grades). In the case of the use of carbon blacks with an isoprene elastomer, the carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of functionalized polyvinylaromatic organic fillers, such as are described in Applications WO-A-2006/069792 and WO-A-2006/069793.

"Reinforcing inorganic filler" should be understood, in the present patent application, by definition, as meaning any inorganic or mineral filler, whatever its colour and its origin (natural or synthetic), also known as "white filler", "clear filler", indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black. Such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, "reinforcing inorganic filler" is also understood to mean mixtures of different reinforcing inorganic fillers, in particular of highly dispersible siliceous and/or aluminous fillers as described below.

Mineral fillers of the siliceous type, especially silica (SiO$_2$), or of the aluminous type, especially alumina (Al$_2$O$_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 m²/g, preferably from 30 to 400 m²/g. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

Finally, a person skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to establish the bond between the filler and the elastomer.

Preferably, the content of total reinforcing filler (carbon black and/or reinforcing inorganic filler, such as silica) is within a range extending from 5 to 120 phr, more preferably from 5 to 100 phr and more preferably still from 5 to 90 phr.

Preferably, the content of total reinforcing filler is within a range extending from 10 to 120 phr, more preferably from 10 to 100 phr and more preferably still from 10 to 90 phr.

More preferably, the content of total reinforcing filler is within a range extending from 20 to 120 phr, more preferably from 20 to 100 phr and more preferably still from 20 to 90 phr.

More preferably still, the content of total reinforcing filler is within a range extending from 30 to 120 phr, more preferably from 30 to 100 phr and more preferably still from 30 to 90 phr.

The carbon black can advantageously constitute the sole reinforcing filler or the predominant reinforcing filler. Of course, it is possible to use just one carbon black or a blend of several carbon blacks of different ASTM grades. The carbon black can also be used as a blend with other reinforcing fillers and in particular reinforcing inorganic fillers as described above, in particular silica.

When an inorganic filler (for example silica) is used in the rubber composition, alone or as a blend with carbon black, its content is within a range from 0 to 70 phr, preferably from 0 to 50 phr, in particular also from 5 to 70 phr, and more preferably still this proportion varies from 5 to 50 phr, particularly from 5 to 40 phr.

Preferably, the rubber composition comprises various additives.

The rubber compositions can also comprise all or a portion of the usual additives customarily used in elastomer compositions intended for the manufacture of tyres, such as, for example, plasticizers or extending oils, whether the latter are aromatic or non-aromatic in nature, pigments, protective agents, such as antiozone waxes, chemical antiozonants or antioxidants, antifatigue agents or indeed even adhesion promoters.

Preferably, the rubber composition comprises a crosslinking system, more preferably a vulcanization system.

The vulcanization system comprises a sulfur-donating agent, for example sulfur.

Preferably, the vulcanization system comprises vulcanization activators, such as zinc oxide and stearic acid.

Preferably, the vulcanization system comprises a vulcanization accelerator and/or a vulcanization retarder.

The sulfur or sulfur-donating agent is used at a preferred content within a range from 0.5 to 10 phr, more preferably within a range from 0.5 to 8.0 phr. The combined vulcanization accelerators, retarders and activators are used at a preferred content within a range from 0.5 to 15 phr. The vulcanization activator or activators is or are used at a preferred content within a range from 0.5 to 12 phr.

The crosslinking system proper is preferably based on sulfur and on a primary vulcanization accelerator, in particular on an accelerator of the sulfenamide type. Additional to this vulcanization system are various known secondary vulcanization accelerators or vulcanization activators, such as zinc oxide, stearic acid, guanidine derivatives (in particular diphenylguanidine), and the like.

Use may be made, as (primary or secondary) accelerator, of any compound capable of acting as accelerator for the vulcanization of diene elastomers in the presence of sulfur, in particular accelerators of the thiazole type, and also their derivatives, and accelerators of thiuram type and of zinc dithiocarbamate type. These accelerators are more preferably selected from the group consisting of 2-mercaptobenzothiazole disulfide (abbreviated to "M BTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Preferably, use is made of a primary accelerator of the sulfenamide type.

In one embodiment, the rubber composition is in the cured, that is to say vulcanized, state. In other embodiments, the composition is in the raw, that is to say non-vulcanized, state, the crosslinked resin having been added subsequently to the non-vulcanized composition.

In one embodiment, the resin not yet having crosslinked, the rubber composition comprises:
A1) at least one aromatic compound comprising at least one aromatic ring bearing at least two functional groups, one of these functional groups being a hydroxymethyl functional group and the other being an aldehyde functional group or a hydroxymethyl functional group; and
A2) at least one phenolic compound chosen from:
  A21) at least one aromatic polyphenol comprising at least one aromatic ring bearing at least two hydroxyl functional groups in the meta position with respect to one another, the two positions ortho to at least one of the hydroxyl functional groups being unsubstituted,
  A22) at least one aromatic monophenol comprising at least one six-membered aromatic ring bearing a single hydroxyl functional group,
    the two positions ortho to the hydroxyl functional group being unsubstituted or
    at least one position ortho to and the position para to the hydroxyl functional group being unsubstituted,
and their mixtures.

Preferably, in this embodiment, the composition is in the raw, that is to say non-vulcanized, state.

Preferably, the rubber composition can be used in the tyre in the form of a layer. Layer is understood to mean any three-dimensional element, having any shape and thickness, in particular as sheet, strip or other element having any cross-section, for example rectangular or triangular.

Of course, all the characteristics relating to the aromatic polyphenol and to the compound of the composition comprising the resin also apply to the composition comprising the aromatic polyphenol and the compound which are not crosslinked in the resin state.

Rubber Composite According to the Invention

The rubber composite is reinforced with at least one reinforcing element embedded in the rubber composition according to the invention.

This rubber composite can be prepared according to a process comprising at least the following steps:
- during a first step, combining at least one reinforcing element with a rubber composition (or elastomer; the two terms are synonyms) according to the invention, in order to form a rubber composite reinforced with the reinforcing element;
- then, during a second step, crosslinking by curing, for example by vulcanization, preferably under pressure, the composite thus formed.

Mention may be made, among reinforcing elements, of textile, metallic or textile-metal hybrid reinforcing elements.

"Textile" is understood to mean, in a way well known to a person skilled in the art, any material made of a substance other than a metallic substance, whether natural or synthetic, which is capable of being transformed into thread or fibre by any appropriate transformation process. Mention may be made, for example, without the examples below being limiting, of a polymer spinning process, such as, for example, melt spinning, solution spinning or gel spinning.

This textile material can consist of a thread or fibre, or also of a fabric produced from threads or fibres, for example a woven fabric with warp threads and weft threads, or else a twill fabric with cross threads.

This textile material of the invention is preferably selected from the group consisting of monofilaments (or individual threads), multifilament fibres, assemblies of such threads or fibres, and the mixtures of such materials. It is more particularly a monofilament, a multifilament fibre or a folded yarn.

Thread or fibre is generally understood to mean any elongate element of great length relative to its cross section, whatever the shape, for example circular, oblong, rectangular, square, or even flat, of this cross section, it being possible for this thread to be straight or not straight, for example twisted or wavy. The largest dimension of its cross section is preferably less than 5 mm, more preferably less than 3 mm.

This thread or fibre may take any known form. For example, it may be an individual monofilament of large diameter (for example and preferably equal to or greater than 50 μm), a multifilament fibre (consisting of a plurality of individual filaments of small diameter, typically less than 30 μm), a textile folded yarn or cord formed from several textile fibres or monofilaments twisted or cabled together, or else an assembly, group or row of threads or fibres, such as, for example, a band or strip comprising several of these monofilaments, fibres, folded yarns or cords grouped together, for example aligned along a main direction, whether straight or not.

The textile materials can be made of organic or polymeric substance, such as made of inorganic substance.

Mention will be made, as examples of inorganic substances, of glass or carbon.

The invention is preferably implemented with materials made of polymeric substance, of both the thermoplastic and non-thermoplastic type.

Mention will be made, as examples of polymeric substances of the non-thermoplastic type, for example, of aramid (aromatic polyamide) and cellulose, both natural and artificial, such as cotton, rayon, flax or hemp.

Mention will preferably be made, as examples of polymeric substances of the thermoplastic type, of aliphatic polyamides and of polyesters. Mention may in particular be made, among the aliphatic polyamides, of the polyamides PA-4,6, PA-6, PA-6,6, PA-11 or PA-12. Mention may be made, among the polyesters, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate).

By definition, metallic is understood to mean one or more threadlike elements composed predominantly (that is to say, for more than 50% of its weight) or entirely (for 100% of its weight) of a metallic material. Preferably, the metallic material is steel, more preferably made of pearlitic (or ferritic-pearlitic) carbon steel advantageously comprising between 0.4% and 1.2% by weight of carbon.

The metallic reinforcing element can be a monofilament, a cord comprising several metallic monofilaments or a multistrand rope comprising several cords, then referred to as strands.

In the preferred case where the reinforcing element comprises several metallic monofilaments or several strands, the metallic monofilaments or the strands are assembled by twisting or braiding. It should be remembered that there exist two possible techniques for assembling:
- either by twisting: the metallic monofilaments or the strands undergo both a collective twist and an individual twist about their own axis, which generates an untwisting torque on each of the monofilaments or strands;
- or by braiding: the metallic monofilaments or the strands only undergo a collective twist and do not undergo an individual twist about their own axis.

Optionally, the reinforcing element comprises several monofilaments and is of the rubberized in situ type, that is to say that the reinforcing element is rubberized from the inside, during its actual manufacture, by a filling rubber. Such metallic threadlike elements are known to a person skilled in the art. The composition of the filling rubber may or may not be identical to the rubber composition in which the reinforcing element is embedded.

Each reinforcing element, when it is textile, is preferably coated with a layer of an adhesive composition or adhesive. The adhesive used is, for example, of the RFL (resorcinol/formaldehyde latex) type or, for example, as described in the publications WO2013017421, WO2013017422, WO2013017423 or else WO2015007642. Thus, the rubber composition according to the invention is in direct contact with the adhesive composition. The adhesive composition is interposed between the rubber composition according to the invention and the reinforcing element.

Tyre According to the Invention

Such tyres are, for example, those intended to equip motor vehicles of passenger type, SUVs ("Sport Utility Vehicles"), two-wheel vehicles (in particular bicycles and motorcycles), aircraft, as for industrial vehicles chosen from vans, "heavy-duty" vehicles—that is to say, underground trains, buses, heavy road transport vehicles (lorries, tractors, trailers) or off-road vehicles, such as heavy agricultural vehicles or earthmoving equipment—, or other transportation or handling vehicles.

By way of example, the appended FIG. 1 represents very diagrammatically (without observing a specific scale) a radial section of a tyre in accordance with the invention for a vehicle of the heavy-duty type.

This tyre 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this diagrammatic figure. A carcass reinforcement 7 is wound around the two bead wires 5 in each bead 4, the turn-up 8 of this reinforcement 7 being, for example, positioned towards the outside of the tyre 1, which is here represented fitted onto its wheel rim 9. The carcass reinforcement 7 is, in a way known per se, composed of at least one ply reinforced by "radial" cords, for example of metal, that is to say that these cords are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

This tyre 1 of the invention has, for example, the characteristic that at least a crown reinforcement 6 and/or its carcass reinforcement 7 comprises a rubber composition or a composite according to the invention. Of course, the invention relates to the objects described above, namely the rubber composite and the tyre, both in the raw state (before curing or vulcanization) and in the cured state (after curing).

Process for the Manufacture of the Composition According to the Invention

The manufacturing process described above and below makes it possible to manufacture the composition according to the invention.

The rubber composition can be manufactured in appropriate mixers using two successive preparation phases well known to a person skilled in the art:
  a first phase of thermomechanical working or kneading ("non-productive" phase) at high temperature, up to a maximum temperature of between 110° C. and 190° C., preferably between 130° C. and 180° C.,
  followed by a second phase of mechanical working ("productive" phase) down to a lower temperature, typically of less than 110° C., for example between 40° C. and 100° C., during which finishing phase the crosslinking system is incorporated.

In one embodiment, the process comprises the following steps:
  incorporating a reinforcing filler in a diene elastomer, during a first step (referred to as "non-productive" step), everything being kneaded thermomechanically (for example, in one or more goes) until a maximum temperature of between 110° C. and 190° C. is reached;
  cooling the combined mixture to a temperature of less than 110° C.;
  subsequently incorporating, during a second step (referred to as "productive" step), a crosslinking system, the aromatic compound A1 and the phenolic compound A2;
  kneading everything up to a maximum temperature of less than 110° C.

By way of example, the non-productive phase is carried out in a single thermomechanical step during which, in a first step, all the necessary base constituents (diene elastomer, reinforcing filler,) are introduced into an appropriate mixer, such as an ordinary internal mixer, and then, in a second step, for example after kneading for one to two minutes, the other additives, optional additional agents for covering the filler or optional additional processing aids, with the exception of the crosslinking system, are introduced. The total duration of the kneading, in this non-productive phase, is preferably between 1 and 15 min.

After cooling the mixture thus obtained, the crosslinking system, the aromatic compound A1 and the phenolic compound A2 are then incorporated in an external mixer, such as an open mill, maintained at a low temperature (for example between 40° C. and 100° C.). The combined mixture is then mixed (productive phase) for a few minutes, for example between 2 and 15 min.

The final composition thus obtained in the raw state can subsequently be calendered, for example in the form of a sheet or of a plaque, in particular for laboratory characterization, or else extruded, for example in order to form a rubber profiled element used in the manufacture of a tyre.

Then, after an optional step of assembling together several compositions formed as plies or strips in the form of a composite or of a raw tyre blank, a step of crosslinking, for example a step of vulcanization or curing, the composition, the composite or the blank is carried out, during which the resin based on the aromatic compound and on the aromatic polyphenol is crosslinked. The crosslinking step, in this instance the vulcanization or curing step, is carried out at a temperature of greater than or equal to 120° C., preferably of greater than or equal to 140° C. The composition is obtained in the cured state.

In another embodiment, the process comprises the following steps:
  incorporating a reinforcing filler, the phenolic compound A2 and the aromatic compound A1 in an elastomer, during a first step, everything being kneaded thermomechanically until a maximum temperature of between 110° C. and 190° C. is reached;
  cooling the combined mixture to a temperature of less than 110° C.;
  subsequently incorporating, during a second step, a crosslinking system;
  kneading everything at a temperature of less than 110° C.

The invention and its advantages will be easily understood in the light of the exemplary embodiments which follow.

Exemplary Embodiments of the Invention and Comparative Tests

These tests demonstrate that:
  the stiffness of the rubber compositions according to the invention is greatly increased with respect to a rubber composition devoid of reinforcing resin,
  the stiffness of the rubber composition is similar (composition C1) or greatly improved (composition C2) with respect to a rubber composition using a conventional reinforcing resin based on a methylene acceptor with HMT or H3M as methylene donor (composition T1),
  the stiffness of the rubber composition according to the invention at high temperatures, in particular for temperatures ranging up to 150° C., is improved with respect to a rubber composition devoid of reinforcing resin,
  the resin of the composition according to the invention is devoid of formaldehyde and does not generate any formaldehyde during its formation.

For this, several rubber compositions, denoted T0 to T3, C1 and C2 below, were prepared as indicated above and are collated in the appended Table 1 below.

All the compositions T0 to T3, C1 and C2 have a shared part in their formulations (expressed in phr, parts by weight per hundred parts of elastomer): 100 phr of natural rubber, 75 phr of carbon black N326, 1.5 phr of N-(1,3-dimethylbutyl)-N-phenyl-para-phenylenediamine, 1.5 phr of stearic acid, 5 phr of ZnO, 1 phr of N-(tert-butyl)-2-benzothiazolesulfamide and 2.5 phr of insoluble sulfur 20H.

The composition T0 does not comprise any reinforcing resin added to this shared part.

In addition to the shared part, the composition T1 comprises a reinforcing resin based on hexamethylenetetramine (1.6 phr) and on a pre-condensed phenolic resin (4 phr). The composition T1 represents a conventional composition of the state of the art exhibiting a greater stiffness than that of the composition T0.

In addition to the shared part, each composition T2 and T3 comprises 14 phr of aromatic polyphenol A21 and 14 phr of benzaldehyde.

In addition to the shared part, the composition C1 comprises 14 phr of aromatic polyphenol A21 and 14 phr of aromatic compound A1.

In addition to the shared part, the composition C2 comprises 14 phr of aromatic polyphenol A21 and 28 phr of aromatic compound A1.

The compositions T0 to T3 are not in accordance with the invention, unlike compositions C1 and C2, which are in accordance with the invention.

In the raw state, each rubber composition T2 and T3, not in accordance with the invention, comprises:
- at least one aromatic aldehyde, in this instance benzaldehyde, and
- at least one aromatic polyphenol comprising at least one aromatic ring bearing at least two hydroxyl functional groups in the meta position with respect to one another, the two positions ortho to at least one of the hydroxyl functional groups being unsubstituted.

In the cured state, each rubber composition T2 and T3, not in accordance with the invention, comprises a phenol/aldehyde resin based:
- on at least one aromatic aldehyde, in this instance benzaldehyde, and
- on at least one aromatic polyphenol comprising at least one aromatic ring bearing at least two hydroxyl functional groups in the meta position with respect to one another, the two positions ortho to at least one of the hydroxyl functional groups being unsubstituted.

In the raw state, each rubber composition C1 and C2 according to the invention comprises:
- at least one aromatic compound comprising at least one aromatic ring bearing at least two functional groups, one of these functional groups being a hydroxymethyl functional group and the other being an aldehyde functional group or a hydroxymethyl functional group; and
- at least one aromatic polyphenol comprising at least one aromatic ring bearing at least two hydroxyl functional groups in the meta position with respect to one another, the two positions ortho to at least one of the hydroxyl functional groups being unsubstituted.

In the cured state, each rubber composition C1 and C2 according to the invention comprises a resin based:
- on at least one aromatic compound comprising at least one aromatic ring bearing at least two functional groups, one of these functional groups being a hydroxymethyl functional group and the other being an aldehyde functional group or a hydroxymethyl functional group; and
- on at least one aromatic polyphenol comprising at least one aromatic ring bearing at least two hydroxyl functional groups in the meta position with respect to one another, the two positions ortho to at least one of the hydroxyl functional groups being unsubstituted.

The aromatic polyphenol of the resin of each composition T2, T3, C1 and C2 is selected from the group consisting of resorcinol, phloroglucinol, 2,2',4,4'-tetrahydroxydiphenyl sulfide, 2,2',4,4'-tetrahydroxybenzophenone, resins pre-condensed from these phenols and the mixtures of these compounds.

The aromatic polyphenol of the composition T1 is a resin pre-condensed from resorcinol and formaldehyde.

The aromatic polyphenol of the composition T3 comprises a single aromatic ring, in this instance a benzene ring, bearing two, and only two, hydroxyl functional groups in the meta position with respect to one another. In the case in point, it is resorcinol.

The polyphenol of each composition T2, C1 and C2 comprises a single aromatic ring, in this instance a benzene ring, bearing three, and only three, hydroxyl functional groups in the meta position with respect to one another. In the case in point, it is phloroglucinol.

For the aromatic polyphenols of each composition T2, T3, C1 and C2, the remainder of the aromatic ring of the aromatic polyphenol is unsubstituted. In particular, the two positions ortho to each hydroxyl functional group are unsubstituted.

The aromatic compound of each composition C1 and C2 according to the invention is 5-(hydroxymethyl)furfural.

Preparation Process

In a first step, the reinforcing filler was incorporated in an elastomer, everything being kneaded thermomechanically until a maximum temperature of between 110° C. and 190° C. was reached. The combined mixture was then cooled to a temperature of less than 110° C. Subsequently, during a second step, the crosslinking system, a pre-condensed resin and a methylene donor (T1) or the aromatic polyphenol and 5-(hydroxymethyl)furfural (C1, C2) or the aromatic polyphenol and benzaldehyde (T2, T3) were incorporated. At the end of this second step, the mixture was heated to 150° C. until the maximum rheometric torque was obtained, in order to vulcanize the composition and crosslink the resin. The stiffness at 23° C. of the composition was then characterized during a tensile test.

Characterization of the Stiffness at High Temperature—Maximum Rheometric Torque

Figure 2:
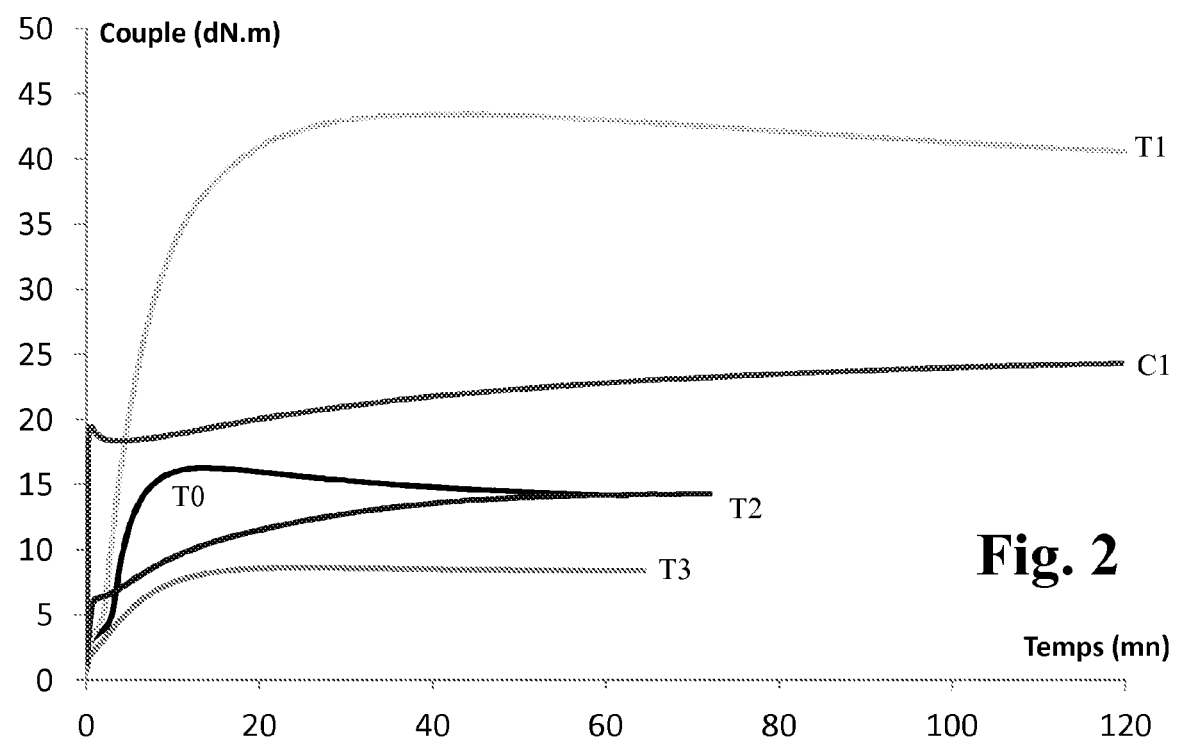
FIG. 2 is a curve representing the change in the rheometric torque for composition C1 and compositions T0 to T3.
Figure 3:
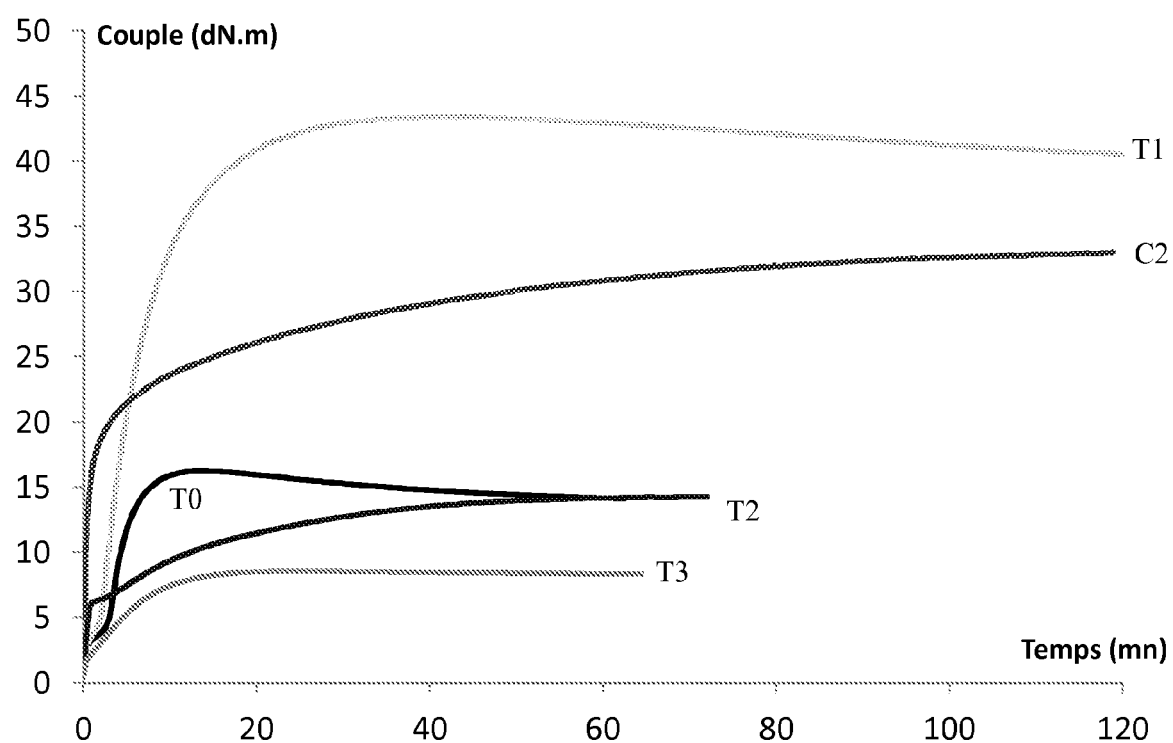
FIG. 3 is a curve representing the change in the rheometric torque for composition C2 and compositions T0 to T3.

The measurements are carried out at 150° C. with an oscillating disc rheometer, according to Standard DIN 53529—Part 3 (June 1983). The change in the rheometric torque as a function of time describes the change in the stiffening of the composition as a result of the vulcanization and of the crosslinking of the resin. From the change in the rheometric torque, the maximum rheometric torque Cmax given in Table 1 is determined. The higher the maximum rheometric torque Cmax, the more the composition exhibits a stiffness which can be maintained at high temperature. Each curve representing the change in the rheometric torque respectively of the compositions C1 and C2 and also those representing the change in the rheometric torque of the compositions T0 to T3 have been represented in FIGS. 2 and 3.

The higher the maximum rheometric torque Cmax, the more the composition exhibits a stiffness which can be maintained at high temperature.

Characterization of the Stiffness at 23° C.—Tensile Test

These tests make it possible to determine the elasticity stresses and the properties at break. Unless otherwise indicated, they are carried out in accordance with Standard ASTM D 412 of 1998 (test specimen C). The "nominal" secant moduli (or apparent stresses, in MPa) at 10% elongation (denoted "MA10") are measured in second elongation (i.e., after an accommodation cycle). All these tensile measurements are carried out under standard temperature and relative humidity conditions, according to Standard ASTM D 1349 of 1999, and are given in Table 1.

First of all, the results of Table 1 show that the use of a reinforcing resin of the state of the art (T1) makes it possible to obtain a better stiffness at 23° C. and a better retention of this stiffness at higher temperatures than for a composition devoid of reinforcing resin (T0). However, the stiffness at 23° C. of the composition T1 is significantly lower than that of the composition C2 according to the invention and similar to that of the composition C1 according to the invention.

Furthermore, the results of Table 1 show that the use of an aromatic aldehyde comprising a benzene ring bearing a single aldehyde functional group (T2 and T3) results in a fall in or at best a maintenance of the stiffness at higher temperatures with respect to the composition T0, unlike the aromatic compounds of compositions C1 and C2, which result in an increase in the maintenance of the stiffness at higher temperatures. These results are relatively unexpected for a person skilled in the art in view of the fact that, a priori, the aromatic compound of compositions C1 and C2 exhibits a lower reactivity than that of the aromatic monoaldehyde of compositions T2 and T3.

The invention is not limited to the embodiments described above.

In other embodiments, it will be possible to envisage for the resin to be based on one or more aromatic compounds A1 and on one or more phenolic compounds A2 in accordance with the invention and, in addition to these constituents, based on one or more additional aldehydes not in accordance with the invention and/or one or more additional aromatic polyphenols or monophenols not in accordance with the invention.

TABLE 1

| Composition | Methylene donor | Phenol | MA10 (MPa) | Cmax (dN · m) |
|---|---|---|---|---|
| T0 | / | / | 6.7 | 16 |
| T1 | Hexamethylenetetramine (1) | SRF resin (2) | 16.5 | 43 |

| Composition | Aromatic aldehyde | Aromatic polyphenol | MA10 (MPa) | Cmax (dN · m) |
|---|---|---|---|---|
| T2 | Benzaldehyde (3) | Phloroglucinol (4) | 14.7 | 14 |
| T3 | Benzaldehyde (3) | Resorcinol (5) | 12.1 | 7 |

| Composition | Aromatic compound | Aromatic polyphenol | MA10 (MPa) | Cmax (dN · m) |
|---|---|---|---|---|
| C1 | 5-(Hydroxymethyl)-furfural (6) | Phloroglucinol (4) | 15.1 | 24 |
| C2 | 5-(Hydroxymethyl)-furfural (6) | Phloroglucinol (4) | 31 | 33 |

(1) Hexamethylenetetramine (from Sigma-Aldrich; of ≥99% purity);
(2) Pre-condensed resin SRF 1524 (from Schenectady; 75% diluted);
(3) Benzaldehyde (from Sigma-Aldrich; of ≥99.5% purity);
(4) Phloroglucinol (from Alfa Aesar; of 99% purity);
(5) Resorcinol (from Sumitomo; of 99.5% purity);
(6) 5-(Hydroxymethyl)furfural (from Aldrich; of ≥99% purity)

The invention claimed is:

1. A rubber composition comprising at least one resin based on:
(A1) at least one aromatic compound comprising at least one aromatic ring bearing at least two functional groups, one of the functional groups being a hydroxymethyl functional group and another of the functional groups being an aldehyde functional group or a hydroxymethyl functional group; and
(A2) at least one phenolic compound selected from the group consisting of:
(A21) at least one aromatic polyphenol comprising at least one aromatic ring bearing at least two hydroxyl functional groups in the meta position with respect to one another, the two positions ortho to at least one of the hydroxyl functional groups being unsubstituted;
(A22) at least one aromatic monophenol comprising at least one six-membered aromatic ring bearing a single hydroxyl functional group, the two positions ortho to the hydroxyl functional group being unsubstituted or at least one position ortho to and the position para to the hydroxyl functional group being unsubstituted; and
mixtures thereof.

2. The rubber composition according to claim 1, wherein the aromatic compound (A1) corresponds to the general formula (II):

where B represents CHO or $CH_2OH$, X represents O, $NR_1$, NO, S, SO, $SO_2$ or $SR_2R_3$, $R_1$ represents a hydrogen or an alkyl, aryl, arylalkyl, alkylaryl or cycloalkyl group, and $R_2$ and $R_3$ each represent, independently of one another, a hydrogen or an alkyl, aryl, arylalkyl, alkylaryl or cycloalkyl group.

3. The rubber composition according to claim 1, wherein the aromatic compound (A1) is selected from the group consisting of 5-(hydroxymethyl)furfural, 2,5-di(hydroxymethyl)furan and mixtures thereof.

4. The rubber composition according to claim 1, wherein the aromatic ring of the aromatic polyphenol bears three hydroxyl functional groups in the meta position with respect to one another.

5. The rubber composition according to claim 1, wherein, on the aromatic ring of the aromatic polyphenol, the two positions ortho to each hydroxyl functional group are unsubstituted.

6. The rubber composition according to claim 1, wherein a remainder of the aromatic ring of the aromatic polyphenol is unsubstituted.

7. The rubber composition according to claim 1, wherein the aromatic polyphenol comprises several aromatic rings, at least two of them each bearing at least two hydroxyl functional groups in the meta position with respect to one another, the two positions ortho to at least one of the hydroxyl functional groups of at least one aromatic ring being unsubstituted.

8. The rubber composition according to claim 7, wherein at least one of the aromatic rings of the aromatic polyphenol bears three hydroxyl functional groups in the meta position with respect to one another.

9. The rubber composition according to claim 1, wherein each aromatic ring of the aromatic polyphenol is a benzene ring.

10. The rubber composition according to claim 1, wherein the aromatic polyphenol is selected from the group consisting of resorcinol, phloroglucinol, 2,2',4,4'-tetrahydroxydiphenyl sulfide, 2,2', 4,4'-tetrahydroxybenzophenone and mixtures thereof.

11. The rubber composition according to claim 1, wherein the aromatic polyphenol is a pre-condensed resin based on:
(a) at least one polyphenol comprising at least one aromatic ring bearing at least two hydroxyl functional groups in the meta position with respect to one another, the two positions ortho to at least one of the hydroxyl functional groups being unsubstituted; and
(b) at least one compound capable of reacting with the polyphenol comprising at least one aldehyde functional group and/or at least one compound capable of reacting with the polyphenol comprising at least two hydroxymethyl functional groups borne by an aromatic ring.

12. The rubber composition according to claim 1 further comprising a diene elastomer selected from the group consisting of polybutadienes, synthetic polyisoprenes, natural rubber, butadiene copolymers, isoprene copolymers and mixtures thereof.

13. The rubber composition according to claim 1, wherein the rubber composition is in the cured state.

14. A rubber composition comprising:
(A1) at least one aromatic compound comprising at least one aromatic ring bearing at least two functional groups, one of these functional groups being a hydroxymethyl functional group and the other being an aldehyde functional group or a hydroxymethyl functional group; and
(A2) at least one phenolic compound selected from the group consisting of:
(A21) at least one aromatic polyphenol comprising at least one aromatic ring bearing at least two hydroxyl functional groups in the meta position with respect to one another, the two positions ortho to at least one of the hydroxyl functional groups being unsubstituted;
(A22) at least one aromatic monophenol comprising at least one six-membered aromatic ring bearing a single hydroxyl functional group, the two positions ortho to the hydroxyl functional group being unsubstituted or at least one position ortho to and the position para to the hydroxyl functional group being unsubstituted; and
mixtures thereof.

15. The rubber composition according to claim 14, wherein the rubber composition is in the raw state.

16. A process for the manufacture of a rubber composition in the raw state, the process comprising the step of:
mixing at least one elastomer, (A1) at least one aromatic compound comprising at least one aromatic ring bearing at least two functional groups, one of these functional groups being a hydroxymethyl functional group and the other being an aldehyde functional group or a hydroxymethyl functional group, and (A2) at least one phenolic compound selected from the group consisting of:
(A21) at least one aromatic polyphenol comprising at least one aromatic ring bearing at least two hydroxyl functional groups in the meta position with respect to one another, the two positions ortho to at least one of the hydroxyl functional groups being unsubstituted;
(A22) at least one aromatic monophenol comprising at least one six-membered aromatic ring bearing a single hydroxyl functional group, the two positions ortho to the hydroxyl functional group being unsubstituted or at least one position ortho to and the position para to the hydroxyl functional group being unsubstituted; and
mixtures thereof.

17. A process for the manufacture of a rubber composition in the cured state, the process comprising the steps of:
manufacturing a rubber composition in the raw state by mixing (A1) at least one aromatic compound comprising at least one aromatic ring bearing at least two functional groups, one of these functional groups being a hydroxymethyl functional group and the other being an aldehyde functional group or a hydroxymethyl functional group, and (A2) at least one phenolic compound selected from the group consisting of:
(A21) at least one aromatic polyphenol comprising at least one aromatic ring bearing at least two hydroxyl functional groups in the meta position with respect to one another, the two positions ortho to at least one of the hydroxyl functional groups being unsubstituted;
(A22) at least one aromatic monophenol comprising at least one six-membered aromatic ring bearing a single hydroxyl functional group, the two positions ortho to the hydroxyl functional group being unsubstituted or at least one position ortho to and the position para to the hydroxyl functional group being unsubstituted; and
mixtures thereof;
shaping the rubber composition in the raw state; and
crosslinking the rubber composition during which a resin based on the phenolic compound (A2) and on the aromatic compound (A1) is crosslinked.

18. A rubber composition obtained by the process of claim 17.

19. A rubber composite reinforced with at least one reinforcing element embedded in the rubber composition of claim 18.

20. A tire comprising a rubber composition according to claim 1.

* * * * *